United States Patent
McKinzie

(10) Patent No.: US 8,640,690 B2
(45) Date of Patent: Feb. 4, 2014

(54) INTERIOR SOLAR HEATER

(76) Inventor: Keith J. McKinzie, Two Harbors, MN (US)

( * ) Notice: Subject to any disclaimer, the term of this patent is extended or adjusted under 35 U.S.C. 154(b) by 1160 days.

(21) Appl. No.: 12/572,331

(22) Filed: Oct. 2, 2009

(65) Prior Publication Data

US 2010/0083951 A1      Apr. 8, 2010

Related U.S. Application Data

(60) Provisional application No. 61/102,229, filed on Oct. 2, 2008.

(51) Int. Cl.
*E04D 13/18*      (2006.01)

(52) U.S. Cl.
USPC ............ 126/628; 126/631; 126/632; 126/633

(58) Field of Classification Search
USPC ................ 126/628, 569; 165/104.19, 104.11, 165/104.15
See application file for complete search history.

(56) References Cited

U.S. PATENT DOCUMENTS

| | | | |
|---|---|---|---|
| 3,012,294 A * | 12/1961 | Waldor | 52/207 |
| 4,002,159 A | 1/1977 | Angilletta | |
| 4,014,313 A | 3/1977 | Pedersen | |
| 4,054,125 A * | 10/1977 | Eckels | 126/633 |
| 4,072,141 A | 2/1978 | Fillios et al. | |
| 4,143,640 A | 3/1979 | Pierce | |
| 4,144,931 A | 3/1979 | Medico, Jr. | |
| 4,191,165 A * | 3/1980 | Faudarole | 126/669 |
| 4,228,787 A | 10/1980 | Steinemann | |
| 4,265,221 A | 5/1981 | Whinnery | |
| 4,271,825 A * | 6/1981 | Schwob et al. | 126/705 |
| 4,301,787 A | 11/1981 | Rice | |
| 4,327,795 A | 5/1982 | Wheeler | |
| 4,333,448 A * | 6/1982 | Johnson | 126/714 |
| 4,416,255 A | 11/1983 | Secamiglio et al. | |
| 4,436,084 A | 3/1984 | Carlston et al. | |
| 4,457,298 A | 7/1984 | Eubank | |
| 4,461,277 A | 7/1984 | Pardo | |
| 4,465,058 A * | 8/1984 | Reick | 126/628 |
| 4,471,758 A | 9/1984 | Jennings | |
| 4,534,335 A * | 8/1985 | Rice | 126/631 |
| 4,592,337 A | 6/1986 | Ritchie et al. | |
| 4,655,195 A * | 4/1987 | Boynton | 126/631 |
| RE32,523 E | 10/1987 | Resnick et al. | |
| 6,899,098 B2 | 5/2005 | Durbin | |
| 2005/0061311 A1 | 3/2005 | Christensen | |
| 2006/0076008 A1 | 4/2006 | Kerr | |

* cited by examiner

*Primary Examiner* — Steven B McAllister
*Assistant Examiner* — Vivek Shirsat
(74) *Attorney, Agent, or Firm* — Leanne Taveggia Farrell; Westman, Champlin & Koehler, P.A.

(57) ABSTRACT

A solar heater includes a plurality of suspended vertical components that cover at least a portion of an interior side of a window and have open top and bottom ends. Each suspended vertical component has a heat absorbing body position within the transparent sheath. The heat absorbing body is located a first spaced distance from the inner sheath surface of a first side portion of the sheath and a second spaced distance from the inner sheath surface of a second side portion of the sheath. The open bottom end of the sheath receives cool ambient air that is heated while passing between the heat absorbing body and the inner sheath surface of the first side portion and between the heat absorbing body and the inner sheath surface of the second side portion. The open top end of the sheath exhausts the heated air to an interior space of a building.

15 Claims, 6 Drawing Sheets

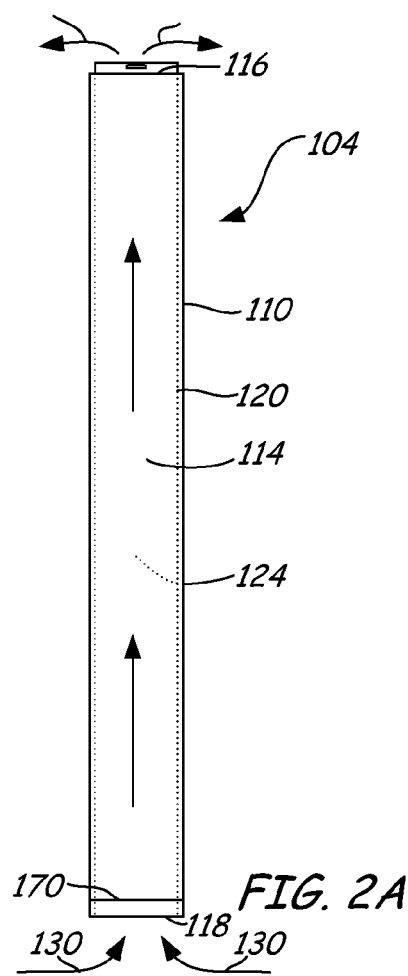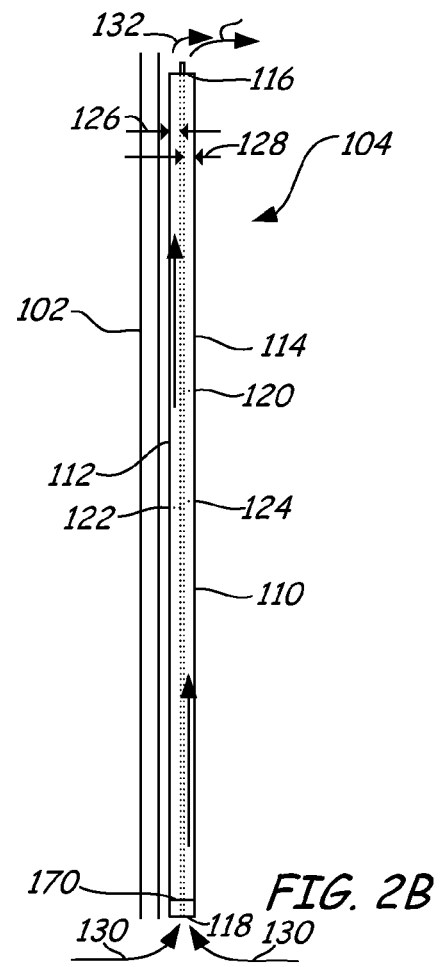

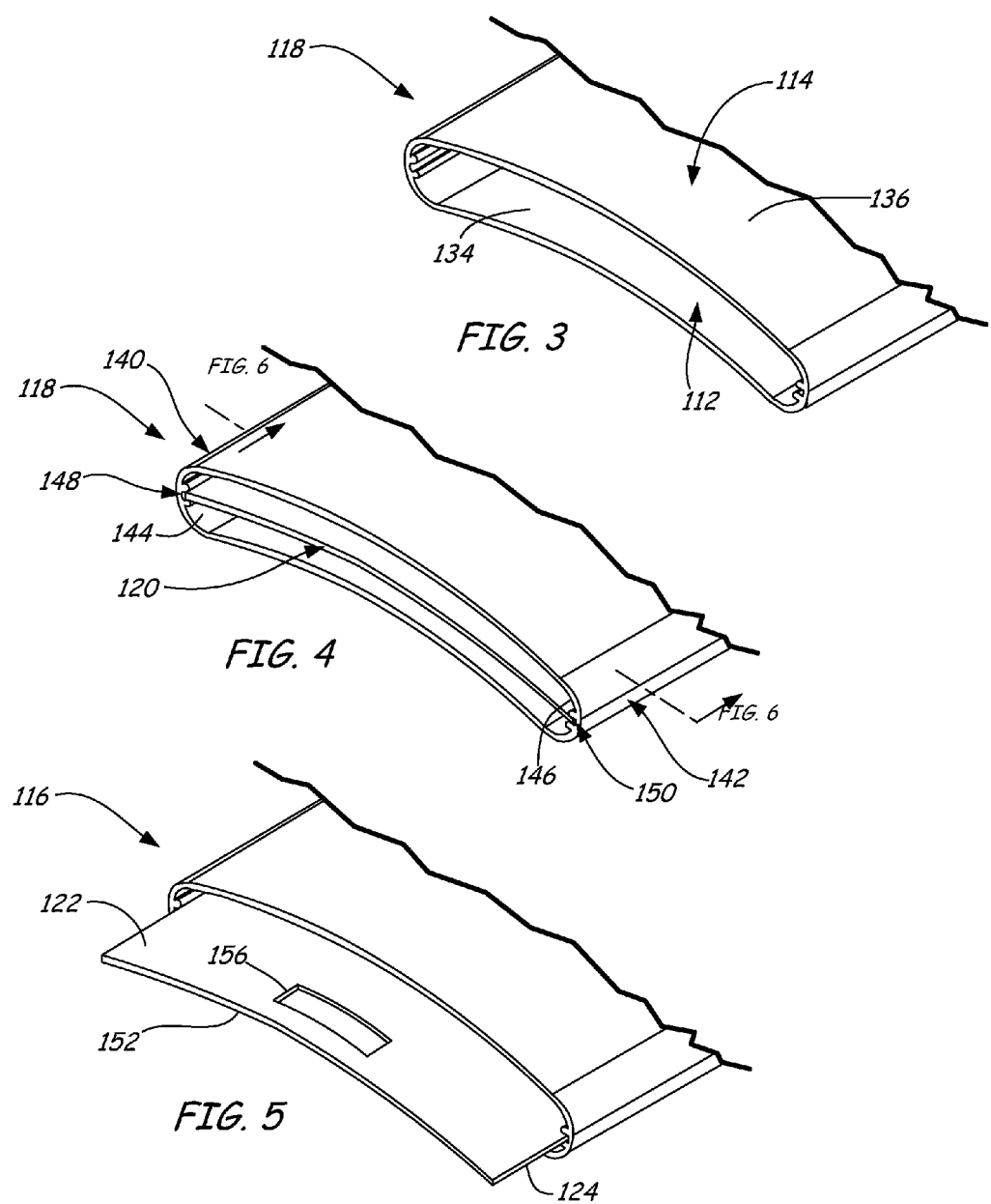

INTERIOR SOLAR HEATER

A window covering or window treatment provides material that covers a window. Conventional window coverings include drapes, curtains, blinds (having both vertical and horizontal slats), shades (including rolling or folding shades), shutters and etc. Window coverings are used to cover a window for a variety of different reasons. In some cases, a window covering is used for decorative purposes or for the purposes of providing privacy. In other cases, a window covering can be used for the purposes of conserving energy.

One type of energy efficient window covering is a solar shade or screen. Solar shades are used to control the amount of sunlight that is allowed into a room. Providing a solar shade on a window in a room that is being cooled during the summer months can provide energy savings by blocking the natural tendency of sunlight to elevate a temperature of a room through the window. In addition, the solar shade or screen can provide the added benefits of preventing damaging UV rays from entering the window.

Another type of energy efficient window covering is an insulating-type cellular shade that provides a high R-value. Besides a window providing resistance to heat transfer, a cellular shade that covers the window can provide additional resistance to heat transfer. This type of shade can aid in keeping a room cool during the summer months by resisting heat from entering from the exterior of a building into the interior of the building. This type of shade can also aid in keeping a room warm in the winter months by resisting heat from escaping from the interior of the building to the exterior of the building.

Although the window coverings mentioned above provide energy savings by blocking light or by providing insulating properties, none of these window coverings capture the inherent heating properties of solar energy.

SUMMARY

In one embodiment, a solar heater includes a plurality of suspended vertical components that cover at least a portion of an interior side of a window and have open top and bottom ends. Each suspended vertical component has a heat absorbing body position within the transparent sheath. The heat absorbing body is located a first spaced distance from the inner sheath surface of a first side portion of the sheath and a second spaced distance from the inner sheath surface of a second side portion of the sheath. The open bottom end of the sheath receives cool ambient air that is heated while passing between the heat absorbing body and the inner sheath surface of the first side portion and between the heat absorbing body and the inner sheath surface of the second side portion. The open top end of the sheath exhausts the heated air to an interior space of a building.

In another embodiment, the heat absorbing body of each suspended vertical component extends beyond or protrudes from the open top end of each transparent sheath. The extended portion couples to a flange that extends across a width of the interior side of the window to support each suspended vertical component.

BRIEF DESCRIPTION OF THE DRAWINGS

FIG. 2A illustrates an enlarged elevation view of one of the vertical components of the solar heater illustrated in FIG. 1.

FIG. 2B illustrates an enlarged side view of the vertical component illustrated in FIG. 2.

FIG. 3 illustrates an enlarged perspective view of a bottom end of the vertical component illustrated in FIGS. 2A and 2B with a heat absorption body removed.

FIG. 4 illustrates an enlarged perspective view of the bottom end of the vertical component illustrated in FIGS. 2A and 2B with the heat absorption body in place.

FIG. 5 illustrates an enlarged perspective view of a top end of the vertical component illustrated in FIGS. 2 and 3 with the heat absorption body in place.

DETAILED DESCRIPTION

Embodiments of the detailed description provide a solar heater that captures solar energy from sunlight passing through a window to supplement the heating of an interior space of a building. Instead of blocking the solar energy that passes through a window (as do many conventional window coverings), embodiments describe utilizing solar energy to assist in warming interior spaces. In particular, embodiments described can be used in covering a window that has a southern exposure. By using the disclosed device, a significant reduction in fuel consumption and cost can be achieved.

Figure 1:
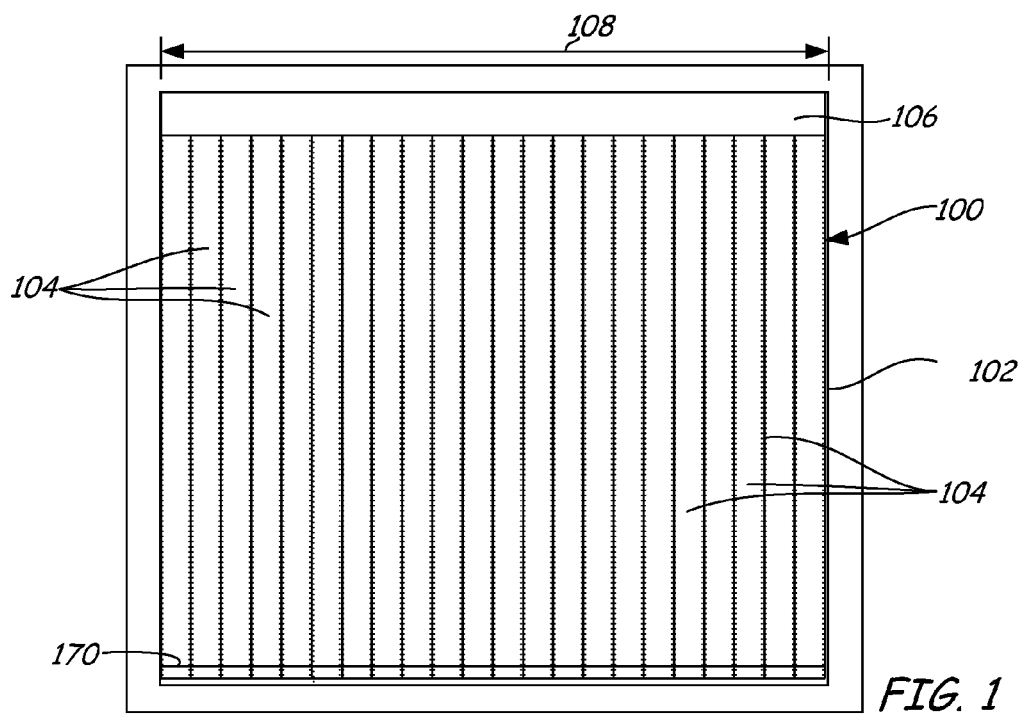
FIG. 1 illustrates an elevation view of a solar heater mounted across a window under one embodiment.

FIG. 1 illustrates an elevation view of a solar heater 100 mounted across a window 102 under one embodiment. Solar heater 100 includes a plurality of suspended vertical components 104 that cover at least a portion of an interior side of window 102. In particular, each vertical component, in combination with other vertical components, can be oriented adjacent to each other across window 102. Vertical components 104 are suspended in a configuration similar to vertical blinds of a vertical blind window treatment. For example, vertical components 104 are suspended from and are coupled to a flange or valence 106 that extends across at least a width 108 of window 102. In other words, vertical components 104 can be attached to a conventional vertical blind tracking system that allows for a grouped movement of vertical components across the width 108 of window 102 and also allows for rotation of each vertical component about a vertical axis.

Vertical components 104 can have various lengths. In one embodiment, vertical components 104 suspend from a conventional tracking system or flange 106 and extend towards a floor of a room. In other embodiments, vertical components 104 suspend from a conventional tracking system or flange 106 and extend only as far as the bottom of the window as is illustrated in FIG. 1.

FIG. 2A illustrates a schematic elevation view of one of the vertical components 104 of the solar heater illustrated in FIG. 1. FIG. 2B illustrates a schematic side view of the vertical component 104 illustrated in FIG. 2A including the general position of window 102. Vertical component 104 includes a transparent sheath 110 defined by a first side portion 112 (hidden from view in FIG. 2A), a second side portion 114, an open top end 116 and an open bottom end 118. As illustrated in dashed lines, vertical component 104 also includes a heat absorbing body 120 positioned within the transparent sheath 110. For example, heat absorbing body 120 can be made of a metallic material, such as aluminum. However, it should be realized that other metallic materials can be used that demonstrate a high propensity to conduct thermal energy. Heat absorbing body 120 includes an energy absorbing surface 122 and an opposing surface 124. As illustrated in FIG. 2B, energy absorbing surface 122 of heat absorbing body 120 is located a first spaced distance 126 from first side portion 112 and opposing surface 124 of heat absorbing body 120 is located a second spaced distance 128 from second side portion 114.

In the embodiments illustrated in the detailed description, solar heater 100 provides a passive system for heating the ambient air in an interior room of a building using solar energy captured from the solar radiation that enters into the window in which it is covering. Generally, the solar radiation is in the form of direct sunlight that passes through the glass of the window and is subsequently absorbed by heat absorbing body 120. The heat absorbed by heat absorbing body 110 is dissipated to the room by natural conduction, convection and radiation.

More specifically and as illustrated by the arrows drawn in FIGS. 2A and 2B, ambient air 130 from the interior room of a building in which vertical component 104 is located enters the open bottom end or inlet 118 of transparent sheath 110. The air surrounding heat absorption body 120 receives heat from the heat absorption body through natural conduction, thereby initiating the air around the heat absorption body to become less dense and rise. Cooler air continues to enter through open bottom end 118 of transparent sheath 110 to replace the heated air that has risen. The heating of ambient air in transparent sheath 120 forms a convection current that travels along the length of vertical component 104 within transparent sheath 110. The convection current of air 132 exits transparent sheath 110 at top open end or outlet 116 at a particular velocity thereby creating a chimney effect. The air 132 exiting at top open end 116 is configured to naturally heat the interior of the room in which the vertical component is in. In one embodiment, the bottom and/or top ends 116 and 118 of transparent sheath 110 can be wider than a width of the middle of the transparent sheath. This tapering affect can increase the velocity of convection current or decrease the velocity of the convection current.

In FIGS. 2A and 2B air flows through transparent sheath 110 in two convection currents. The first current passes through transparent sheath 110 between first side portion 112 and energy absorbing surface 122 of heat absorbing body 120. The second current passes through transparent sheath 110 between second side portion 114 and opposing surface 124 of heat absorbing body 120. Although energy absorbing surface 122 is the side of heat absorbing body 120 that is most effected by the sunlight, heat transfer via conduction can take place such that the entire body 120 including opposing surface 124 is also heated and able to cause a second convection current as illustrated.

In one embodiment not specifically illustrated, the bottom and/or top ends of sheath 110 can be wider than a width of the middle of the sheath. If indeed the bottom and/or top ends of sheath 114 are wider than a width of the middle of the sheath, this tapering affect can increase the velocity of convection current or decrease the velocity of the convection current.

In another embodiment, the metallic material of heat absorbing body 120 can be coated with a material that colors the body black. The black-colored body 120 increases the propensity for body 120 to absorb more heat from the solar energy entering through the window. A black body absorbs all light that falls on it and, therefore, an ideal source of thermal radiation to heat the air that surrounds it.

Although body 120 can be completely coated with a black-colored material, it is possible for the energy absorbing surface 122 to be coated with a black color and opposing surface 124 to be coated with a white or other colored material. Therefore, in the winter or heating season months, the energy absorbing surface 122 or the black surface of heat absorbing body 120 can be oriented towards the window such it absorbs a maximum amount of solar energy, while in the summer or cooling season months, the opposing surface 124 or other colored face of energy absorbing surface 122 can be oriented towards the window such that body 120 will reflect the solar energy.

In one embodiment, sheath 110 comprises plastic. For example, sheath 114 can include a rigid UL plastic. Utilizing a rigid plastic for sheath 114 allows the sheath to be warm to the touch, but not hot to the touch. A plastic sheath will protect objects (i.e. children, furniture, etc.), that could come in contact with vertical component 104, from being burned.

The tracking system of which vertical components 104 are coupled to is configured to rotate each vertical component 104 into at least four basic positions and any position there between. In a first position (as is illustrated in FIGS. 1, 2A and 2B), second side portion 114 of each vertical component 104 is oriented at least substantially parallel with a surface of a window and faces towards the interior of a room. In the first position, the first side portion (shown in FIG. 2B) faces the surface of the window. A second position is opposite the first position. In the second position, second side portion 114 is oriented at least substantially parallel with a surface of the window. In the second position, second side portion 114 faces towards the window and the first side portion 112 faces towards the interior of the room. In a third position, second side portion 114 is oriented in a direction that is at least substantially perpendicular from the surface of the window. In the third position, third side portion 140 (as described in FIG. 4) faces the surface of the window and third side portion 142 (as described in FIG. 4) faces the interior of the room. A fourth position is opposite the third position. In the fourth position, second side portion 114 is oriented in a direction that is at least substantially perpendicular from the surface of the window. In the fourth position, fourth side portion 142 faces the window and third side portion 140 faces towards the interior of the room.

With the varying degrees of rotation of each vertical component 104, the amount of heat that is produced by the natural conduction and convection can be controlled. For example, if it is desired to heat the room to a high temperature, vertical component 104 is oriented into the first position. The first position provides the maximum amount of heat to be produced. In another example, if it is found that the room is too hot and the supplement heat from vertical component is undesirable, vertical components 104 can be oriented into the either the third position or the fourth position. In the third and fourth positions, the surface area that is exposed to solar energy passing through the window is at its minimum. Therefore, the effects of creating natural conduction and convection are minimized. In yet another example, if it is desirable to have an amount of heat somewhere between the maximum and minimum, the vertical slat can be oriented somewhere between the first position and either the third or fourth positions.

FIG. 3 illustrates an enlarged perspective view of the open bottom end 118 of the vertical component 104 illustrated in FIGS. 2A and 2B with the heat absorbing body removed. First side portion 112 includes an outer sheath surface (hidden from view in FIG. 3) for facing the window and an inner sheath surface 134. Second side portion 114 includes an outer sheath surface 136 for facing an interior of a building or a room and an inner sheath surface (hidden from view in FIG. 3). In one embodiment and not specifically illustrated, outer sheath surface 136 of second side portion 114 can include an added decorative layer made of a variety of different materials, fabrics, textures, colors and etc. A layer on outer sheath surface 136 allows vertical component 104 to take on a more visual pleasing look while still performing the natural conduction and convection functions for heating an interior room.

FIG. 4 illustrates an enlarged perspective view of the open bottom end 118 of the vertical component 104 illustrated in FIGS. 2A and 2B with the heat absorbing body 120 in place. As illustrated in FIG. 4, transparent sheath 110 further includes a third side portion 140 and an opposing fourth side portion 142 that couple the first and second side portion 112 and 114 together. Third side portion 140 includes an inner surface 144 and fourth side portion 142 includes an inner surface 146. A first track 148 is located on inner surface 144 of third side portion 140 to protrude into an interior space defined by transparent sheath 110. A second track 150 is located on inner surface 146 of fourth side portion 142 to protrude into the interior space defined by transparent sheath 110. As illustrated, heat absorbing body 120 is held within transparent sheath 110 by first and second tracks 148 and 150. For example, first and second tracks 148 and 150 can receive heat absorbing body 120 when the heat absorption body is slid into the transparent sheath in the first and second tracks.

FIG. 5 illustrates an enlarged perspective view of the open top end 116 of the vertical component 104 illustrated in FIGS. 2A and 2B with the heat absorbing body 120 in place. Heat absorbing body 120 includes a top end 152 and a bottom end (not illustrated in FIG. 5). As illustrated, top end 152 of heat absorbing body 120 extends beyond or protrudes from open top end 116 of transparent sheath 120. Proximal to top end 152, heat absorbing body 120 includes an aperture 156. Aperture 156 extends from energy absorbing surface 122 to opposing surface 124 and is for use for coupling to a flange or tracking system that spans across a width of the interior side of a window to support each suspended vertical component 104.

Figure 6:
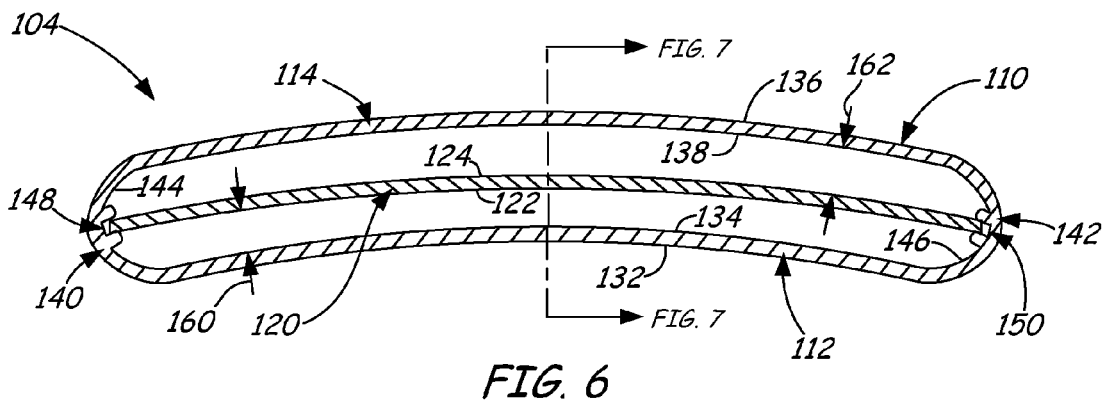
FIG. 6 illustrates a sectional view of the vertical component as indicated in FIG. 4.

FIG. 6 illustrates a sectional view of the vertical component 104 as indicated in FIG. 4. In FIG. 6, heat absorbing body 120 is clearly shown as being positioned within transparent sheath 110. In particular, energy absorbing surface 122 of heat absorbing body 120 is located a first spaced distance 160 from inner sheath surface 134 of first side portion 112 and room facing surface 124 of heat absorbing body 120 is located a second spaced distance 162 from inner sheath surface 138 of second side portion 114. First spaced distance 160 and second spaced distance 162 are adequately spaced from heat absorbing body 120 as not to constrain airflow. As illustrated, first space distance 160 and second spaced distance are substantially equal. For example, spaced distances 160 and 162 can be 0.25 to 0.5 of an inch.

As illustrated in FIG. 6, first side portion 112 and second side portion 114 of which third and fourth side portions 140 and 142 couple together include arcuate profiles. In particular, outer sheath surface 132 of first side portion 112 includes a concave surface with respect to a window and inner sheath surface 134 includes a convex surface with respect to heat absorbing body 120. Outer sheath surface 136 of second side portion 112 includes a convex surface with respect to interior space of a building or room and inner sheath surface 138 includes a concave surface with respect to heat absorbing body 120.

Heat absorbing body 120 also includes an arcuate profile that follows the arcuate profile of first and second side portions 112 and 114. In particular, energy absorbing surface 122 includes a concave surface with respect to a window and opposing surface 124 include a convex surface with respect to interior space of a building or room.

Figure 7:
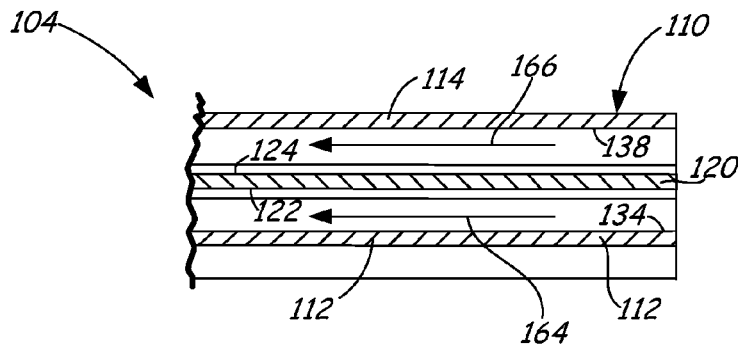
FIG. 7 illustrates a sectional view of the vertical component as indicated in FIG. 6.

FIG. 7 illustrates a sectional view of the vertical component 104 as indicated in FIG. 6. In FIG. 7 the two convection air currents that flow through transparent sheath 110 are more clearly illustrated. A first current 164 passes through transparent sheath 110 between inner sheath surface 134 of first side portion 112 and energy absorbing surface 122 of heat absorbing body 120. A second current 166 passes through transparent sheath 110 between inner sheath surface 138 of second side portion 114 and opposing surface 124 of heat absorbing body 120. As previously discussed, although energy absorbing surface 122 is the side of heat absorbing body 120 that is absorbs the sunlight, heat transfer via conduction can take place such that the entire body 120 including opposing surface 124 is also heated and able to cause second convection current 166 as illustrated.

Figure 8:
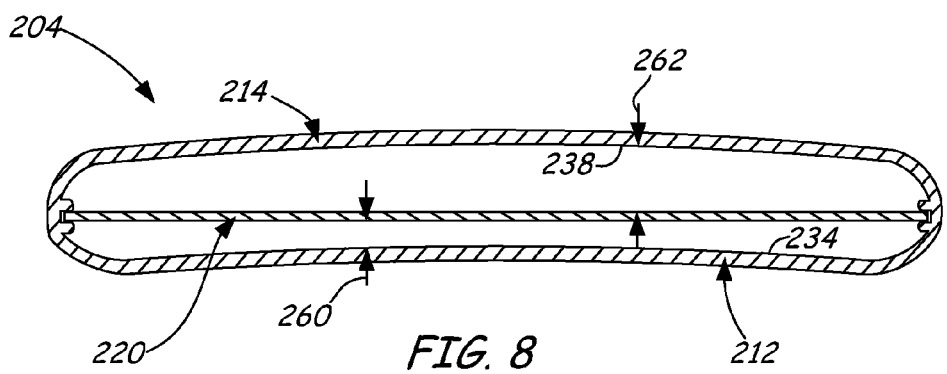
FIG. 8 illustrates a sectional view of a vertical component under another embodiment.

FIG. 8 illustrates a sectional view of a vertical component 204 under another embodiment. Vertical component 204 is similar to vertical component 104 illustrated in FIG. 6 where first side portion 212 and second side portion 214 include similar arcuate profiles. However, instead of the heat absorbing body matching the arcuate profile of the first and second side portions, heat absorbing body 220 includes a planar profile. With a planar profile, heat absorbing body 220 is still located a first spaced distance 260 from inner sheath surface 234 of first side portion 212 and a second spaced distance 262 from inner sheath surface 238 of second side portion 214. However, first and second spaced distances 260 and 262 are not necessarily substantially equal.

Figure 9:
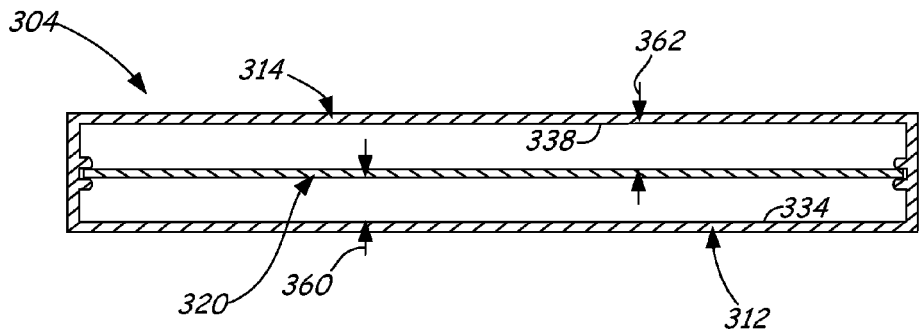
FIG. 9 illustrates a sectional view of a vertical component under yet another embodiment.

FIG. 9 illustrates a sectional view of a vertical component 304 under yet another embodiment. Vertical component 304 is similar to vertical component 104 illustrated in FIG. 6 and vertical component 204 illustrated in FIG. 8. However, instead of the first and second side portions including arcuate profiles, first side portion 312 and second side portion 314 include planar profiles. In addition, heat absorbing body 320 matches first and second side portions 312 and 314 and also includes a planar profile. With each planar profile, heat absorbing body 320 is still located a first spaced distance 360 from inner sheath surface 334 of first side portion 312 and a second spaced distance 362 from inner sheath surface 338 of second side portion 314. Like vertical component 104 of FIG. 6, first and second spaced distances 360 and 362 are substantially equal.

Although not specifically illustrated, in one embodiment, vertical components can includes a circular profile, where both the sheath and heat-absorbing body have a circular shape or diameter. A circular heat absorbing body and sheath would still maintain a spaced distance from each other to provide the natural conduction and convection functions similar to the embodiments illustrated in FIGS. 1-9.

Figure 10:
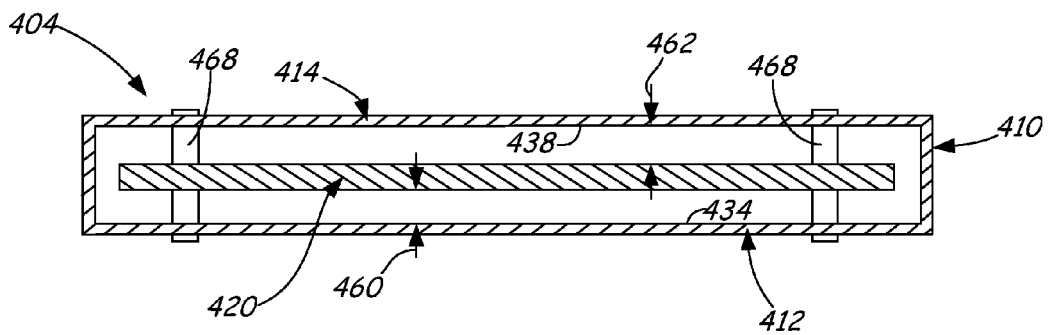
FIG. 10 illustrates a sectional view of a vertical component in yet another embodiment.

FIG. 10 illustrates a sectional view of a vertical component 404 under yet another embodiment. In FIG. 10, instead of the heat absorbing body coupled to the sheath via tracks as is illustrated in the FIGS. 6, 7, 8 and 9 embodiments, heat absorbing body 420 is coupled to sheath 410 by fasteners 468 that are spaced apart down the vertical length of vertical component 404. Not only are fasteners 468 configured to hold heat absorbing body 420 within sheath 410, fasteners 468 are also configured to maintain a first spaced distance 460 from inner sheath surface 434 of first side portion 412 to heat absorbing body 420 and a second spaced distance 462 from inner sheath surface 438 to heat absorbing body 420. Like vertical component 104 of FIG. 6 and vertical component 304 of FIG. 9, first and second spaced distances 460 and 462 are substantially equal.

Figure 11A:
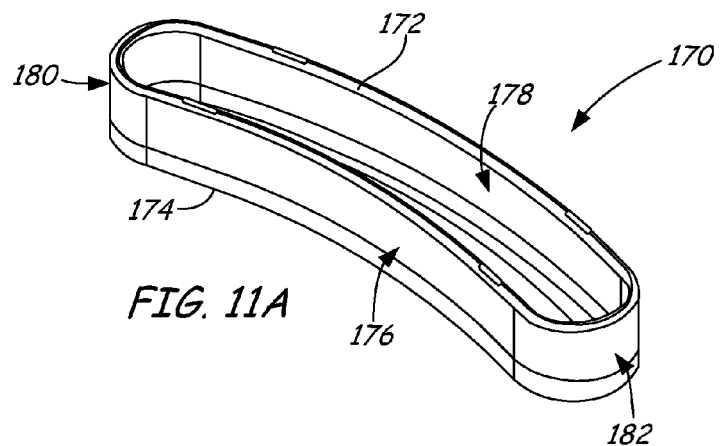
FIG. 11A illustrates a perspective view of a cap for use with various embodiments illustrated in FIGS. 3-9.
Figure 11B:
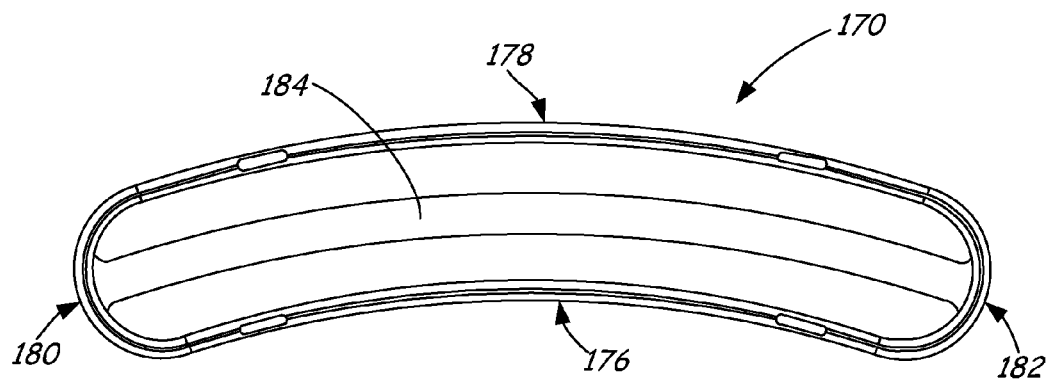
FIG. 11B illustrates a top plan view of the cap illustrated in FIG. 11A.
Figure 11C:
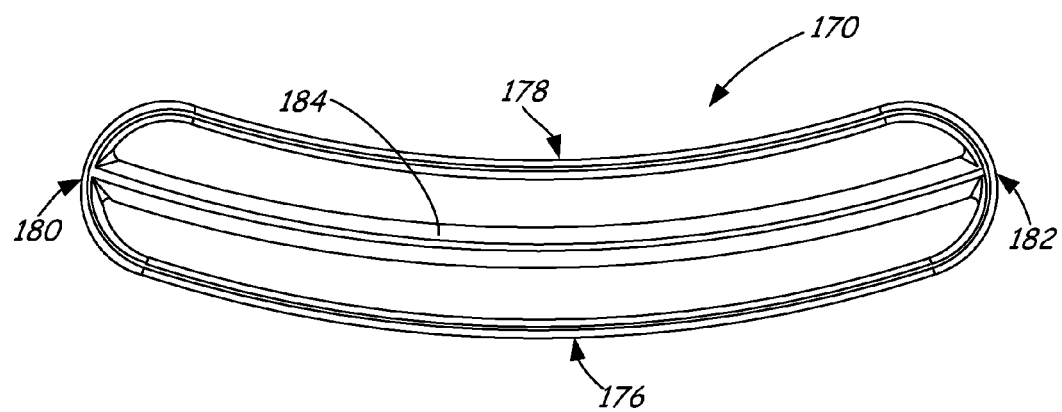
FIG. 11C illustrates a bottom plan view of the cap illustrated in FIG. 11A.

FIG. 11A illustrates a perspective view of a cap 170 for use with various embodiments illustrated in FIGS. 3-9. FIG. 11B illustrates a top plan view of cap 170 and FIG. 11C illustrates a bottom plan view of cap. Cap 170 is also illustrated in an engaged position on vertical components 104 in FIGS. 1, 2A and 2B. Cap 170 is configured for engaging or mating with open bottom end 118 of sheath 110. Cap 170 includes a top end 172, a bottom end 174, a first side portion 176 that engages with the first side portion 112 of transparent sheath 110, a second side portion 178 that engages with the second side portion 114 of transparent sheath 110, a third side portion 180 that engages with the third side portion 140 of transparent sheath 110 and a fourth side portion 182 that engages with the fourth side portion 142 of transparent sheath 110.

Cap 170 includes a beam 184. Beam 184 extends from third side portion 180 to fourth side portion 182 at the bottom end 174 of cap 170. Beam 184 is configured to align with heat absorbing body 120 that is positioned within transparent sheath 110. Therefore, cap 170 provides vertical component 104 with addition means, beside the inner tracks, for supporting heat absorbing body 120 within transparent sheath 110 such that it does not slide out. Beam 184 of cap 170 does not interfere with the spaced distances between heat absorbing body 120 and inner sheath surfaces of transparent sheath 110 such that two airflow convection currents can be maintained.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A solar heater comprising:
   a plurality of suspended vertical components that cover at least a portion of an interior side of a window, each suspended vertical component comprising:
   a transparent sheath defined by a first side portion, a second side portion, an open top end and an open bottom end, the first side portion having an outer sheath surface for facing the window and an inner sheath surface and the second side portion having an outer sheath surface for facing an interior space of a building and an inner sheath surface;
   a heat absorbing body positioned within the transparent sheath and having an energy absorbing surface and a room facing surface, the energy absorbing surface of the heat absorbing body located a first spaced distance from the inner sheath surface of the first side portion and the room facing surface of the heat absorbing body located a second spaced distance from the inner sheath surface of the second side portion, wherein the heat absorbing body extends from a top that attaches to a valence structure and extends entirely beyond the open top of the transparent sheath to at least the open bottom of the transparent sheath;
   wherein the first and second spaced distances are substantially equal;
   wherein the open bottom end of the transparent sheath receives cool ambient air that is heated while passing between the inner sheath surface of the first side portion and energy absorbing surface of the heat absorbing body and between the inner sheath surface of the second side portion and the room facing surface of the heat absorbing body; and
   wherein the open top end of the transparent sheath exhausts the air heated by the heat absorbing body to the interior space of a building.

2. The solar heater of claim 1, wherein the first side portion and the second side portion of the transparent sheath comprise arcuate profiles.

3. The solar heater of claim 1, wherein the heat absorbing body comprises an arcuate profile.

4. The solar heater of claim 1, wherein the heat absorbing body comprises a planar profile.

5. The solar heater of claim 1, wherein the heat absorbing body comprises a metallic material.

6. The solar heater of claim 5, wherein the energy absorbing surface of the heat absorbing body is blackened.

7. The solar heater of claim 1, wherein the transparent sheath further comprises:
   third and fourth side portions that couple the first and second side portions together;
   a first track located on an inner surface of the third side portion to thereby protrude into an interior space of the transparent sheath; and
   a second track located on an inner surface of the fourth side portion to thereby protrude into the interior space of the transparent sheath.

8. The solar heater of claim 7, wherein the heat absorbing body is held in place within the transparent sheath by the first track and the second track.

9. The solar heater of claim 1, further comprising a cap for mating with the open bottom end of the transparent sheath to support the heat absorbing body.

10. The solar heater of claim 9, wherein the cap comprises:
    a top end;
    a bottom end;
    a first side portion for engaging with the first side portion of the transparent sheath;
    a second side portion for engaging with the second side portion of the transparent sheath;
    a third side portion for engaging with the third side portion of the transparent sheath;
    a fourth side portion for engaging with the fourth side portion of the transparent sheath; and
    a beam extending from the third side portion to the fourth side portion at the bottom end of the cap to align with the heat absorbing body in the transparent sheath.

11. A method of heating interior space of a building, the method comprising:
    obtaining a plurality of suspended vertical components that cover an interior side of a window, each vertical component including a heat absorbing body positioned within a transparent sheath, the heat absorbing body located a first spaced distance from a first side portion of the transparent sheath, located a second spaced distance from a second side portion of the transparent sheath and extending from an open bottom end of the transparent sheath to a top that is located entirely beyond an open top end of the transparent sheath, wherein the first spaced distance and the second spaced distance are substantially equal;

supporting the plurality of suspended vertical components by coupling the heat absorbing body that extends entirely beyond the open top end of the transparent sheath to a valence that extends across a width of the interior side of the window;

receiving cool ambient air through the open bottom end of each transparent sheath such that the air is directed between an inner sheath surface of the first side portion and an energy absorbing surface of the heat absorbing body and between an inner sheath surface of the second side portion and a room facing surface of the heat absorbing body;

heating the cool air as the air passes by the energy absorbing and room facing surfaces of the heat absorbing body; and exhausting heated air to the interior of space of the building through the open top end of each transparent sheath such that the heated ambient air is directed to the interior space of the building from between the inner sheath surface of the first side portion and the energy absorbing surface of the heat absorbing body and between the inner sheath surface of the second side portion and the room facing surface of the heat absorbing body.

12. The method of claim 11, further comprising supporting the plurality of suspended vertical components by coupling the heat absorbing body to a flange that extends across a width of the interior side of the window.

13. The method of claim 11, further comprising supporting the heat absorbing body within the transparent sheath by providing:
   a first track located on an inner surface of a third side portion of the transparent sheath that couples the first and second side portions together to thereby protrude into an interior space of the transparent sheath;
   a second track located on an inner surface of a fourth side portion of the transparent sheath that couples the first and second side portions together to thereby protrude into the interior space of the transparent sheath; and
   wherein the first and second tracks receive the heat absorbing body.

14. The method of claim 11, further comprising supporting the heat absorbing body within the transparent sheath by providing a cap for mating with the open bottom end of the transparent sheath to support the heat absorbing body.

15. The method of claim 13, wherein the cap comprises:
   a top end;
   a bottom end;
   a first side portion for engaging with the first side portion of the transparent sheath;
   a second side portion for engaging with the second side portion of the transparent sheath;
   a third side portion for engaging with the third side portion of the transparent sheath;
   a fourth side portion for engaging with the second side portion of the transparent sheath; and
   a beam extending from the third side portion to the fourth side portion at the bottom end of the cap to align with the heat absorbing body in the transparent sheath.

* * * * *